US012024940B2

(12) United States Patent
Gray

(10) Patent No.: US 12,024,940 B2
(45) Date of Patent: Jul. 2, 2024

(54) PRE-FORMED GLAZING UNIT

(71) Applicant: Lockwood Packaging Ltd, Hadleigh (GB)

(72) Inventor: Mark Gray, Hadleigh (GB)

(73) Assignee: Lockwood Packaging Ltd, Hadleigh (GB)

( * ) Notice: Subject to any disclaimer, the term of this patent is extended or adjusted under 35 U.S.C. 154(b) by 3 days.

(21) Appl. No.: 17/778,501

(22) PCT Filed: Nov. 19, 2020

(86) PCT No.: PCT/GB2020/052962
§ 371 (c)(1),
(2) Date: May 20, 2022

(87) PCT Pub. No.: WO2021/099794
PCT Pub. Date: May 27, 2021

(65) Prior Publication Data

US 2022/0412152 A1 Dec. 29, 2022

(30) Foreign Application Priority Data

Nov. 22, 2019 (GB) ...................................... 1917009

(51) Int. Cl.

| | |
|---|---|
| ***E06B 3/54*** | (2006.01) |
| ***E06B 3/64*** | (2006.01) |
| ***E06B 3/663*** | (2006.01) |
| ***E06B 5/02*** | (2006.01) |
| *E04H 1/12* | (2006.01) |

(52) U.S. Cl.
CPC .......... *E06B 3/5427* (2013.01); *E06B 3/5436* (2013.01); *E06B 3/645* (2013.01);
(Continued)

(58) Field of Classification Search
CPC ...... E06B 3/5427; E06B 3/5436; E06B 3/645; E06B 3/66309; E06B 3/5481; E06B 5/02; E06B 7/14; E04D 13/03
(Continued)

(56) References Cited

U.S. PATENT DOCUMENTS 4,671,031 A * 6/1987 Intengan .................. E06B 3/28 52/789.1
4,730,426 A * 3/1988 Weisner .................. E04D 13/03 52/200
(Continued)

FOREIGN PATENT DOCUMENTS

DE 2501385 A 7/1976
DE 2806612 A 8/1979
(Continued)

OTHER PUBLICATIONS

International Search Report & Written Opinion of Corresponding PCT Application No. PCT/GB2020/052962 dated Feb. 1, 2021.
(Continued)

*Primary Examiner* — Ryan D Kwiecinski
(74) *Attorney, Agent, or Firm* — Calderon, Safran & Wright P.C.

(57) ABSTRACT

A pre-formed glazing unit for installation in an opening defined in a structure such as a shed, greenhouse or other temporary building comprises a face panel having a periphery enclosing the face panel and a mounting flange for attachment to an inward side of the structure around a peripheral edge of the opening in use, the mounting flange being connected to the periphery of the face panel by a connecting wall. The connecting wall is integrally formed with the face panel and the mounting flange and extends away from the mounting flange to space the face panel from the mounting flange in an outward direction. The face panel and/or a top panel of the connecting wall may be inclined
(Continued)

and/or a bottom panel of the connecting wall may include a drip-inducing formation to direct water away from the structure in use. A double-glazed variant is also disclosed.

17 Claims, 8 Drawing Sheets

(52) U.S. Cl.
CPC ............ *E06B 3/66309* (2013.01); *E06B 5/02* (2013.01); *E04H 1/1205* (2013.01)

(58) Field of Classification Search
USPC .......................................................... 52/208
See application file for complete search history.

(56) References Cited

U.S. PATENT DOCUMENTS 6,694,683 B2 * 2/2004 Anderson ............ F23M 11/042 52/204.5
6,735,922 B2 * 5/2004 Paffen ........................ E06B 3/66 52/204.593
D661,405 S * 6/2012 Sincic .......................... D25/48.7
8,291,657 B2 * 10/2012 White ........................ E06B 5/12 89/937
2009/0031649 A1 * 2/2009 Nemazi ............... E04D 13/0315 52/745.15

FOREIGN PATENT DOCUMENTS

DE 102013000033 A1 7/2013
GB 2116241 A 9/1983
LU 68294 A 8/1973

OTHER PUBLICATIONS

UKIPO Combined Search & Exam Report of Corresponding GB Application No. 1917009.1 dated Jan. 13, 2020.

* cited by examiner

PRE-FORMED GLAZING UNIT

CROSS-REFERENCE TO RELATED APPLICATIONS AND CLAIM TO PRIORITY

This application is a national stage application of International Application No. PCT/GB2020/052962 filed Nov. 19, 2020, which claims priority to United Kingdom Patent Application No. 1917009.1 filed Nov. 22, 2019, the disclosures of which are incorporated herein by reference and to which priority is claimed.

FIELD OF THE INVENTION

The present invention relates to pre-formed glazing units for use in building structures. In particular, but not exclusively, the invention relates to pre-formed plastic glazing units and glazing assemblies for use in timber structures such as sheds and cabins, and to associated methods.

BACKGROUND TO THE INVENTION

Garden sheds and similar structures, as may be referred to as temporary or accessory buildings, are in widespread use for a wide variety of purposes. Examples include storage sheds or shacks, domestic greenhouses, summer houses, playhouses, bicycle stores, garden offices, cabins and so on. Such structures may be low cost and lightweight, and are often of timber construction.

In many cases, the parts to form a shed or other accessory building are provided in kit form for easy storage, distribution and delivery to an installation site. The kit of parts may be designed for easy assembly on-site by a homeowner or contractor.

Accessory buildings often include glazed windows, in which a glass pane is mounted in a window frame. Typically, such windows are of simple construction, reflecting the low cost and lightweight nature of the structure. In a common arrangement, a rebate (or rabbet) is provided in the frame material around the peripheral edge of the window opening to accept the pane, and the pane is held in place by battens or moulding that are nailed or screwed into the pane from the outside of the structure.

One problem with such window arrangements is that the glass panes are relatively fragile, and can be hazardous if broken. This presents a safety hazard in use and during shipping, to the extent that it can be impractical to incorporate glass panes into a kit of parts together with timber panels and so on. Another problem is that the method of fixing the pane into place by attaching a batten from the outside carries a relatively high risk of damaging the pane during installation.

Such arrangements can also be relatively insecure, since it is possible to lever off the battens or mouldings from the outside and remove the pane to gain access to the interior of the building.

Use of a single glass pane typically provides relatively poor performance in terms of thermal and noise transmission. While in some applications it would be desirable to provide improved thermal performance and to reduce noise transmission, for example to reduce energy consumption in a heated shed or greenhouse, the cost of known double-glazing units is usually prohibitively expensive for such applications.

This prior art construction can also contribute to failure of the building structure due to water ingress. In particular, water can seep between the pane and the battens or mouldings and soak into the frame and the surrounding structure, accelerating the rate of rotting. Once water has penetrated the frame it typically travels down the inside face of the wall beneath the window, creating damp problems inside the structure that can case bad odour, property damage, fungal and mould growth and structural failure.

It is known in some cases to use a sheet of plastics material as the glazing pane, instead of glass. While this can mitigate some of the difficulties associated with breakage of the pane, it does not overcome the problems with damage during installation, insecurity and water ingress.

It is against this background that the present invention has been devised.

SUMMARY OF THE INVENTION

A first aspect of the present invention provides a pre-formed glazing unit for installation in an opening defined in a structure, the glazing unit comprising a face panel having a periphery enclosing the face panel, and a mounting flange for attachment to an inward side of the structure around a peripheral edge of the opening in use. The mounting flange is connected to the periphery of the face panel by a connecting wall. The connecting wall is integrally formed with the face panel and the mounting flange and extends away from the mounting flange to space the face panel from the mounting flange in an outward direction.

With this arrangement, a single-piece glazing unit is provided that can be fitted to the inward side of the structure, thereby improving security and with minimal risk of damage during installation. The face panel of the glazing unit projects outwardly from the mounting flange so that, when suitably sized, at least a part of the face panel is spaced outwardly from the outer side of the structure, providing an improved aesthetic appearance and reducing the risk of water ingress. The cost of providing battens or other fixings is also eliminated, since the mounting flange can be fixed directly to a frame of the structure.

The periphery of the face panel may include a top edge portion, and the connecting wall may comprise a top panel connected to the top edge portion of the periphery. Preferably, at least a portion of the top panel is inclined downwardly towards the face panel to deflect water in the outward direction in use.

The periphery of the face panel may include a bottom edge portion, and the connecting wall may comprise a bottom panel connected to the bottom edge portion of the periphery. In this case, the bottom panel may be shaped to provide a drip-inducing formation. For example, at least a portion of the bottom panel may be inclined downwardly towards the face panel to provide the drip-inducing formation. The drip-inducing formation may be disposed adjacent to the bottom edge of the face panel. In these ways, the shape of the glazing unit helps to direct water away from the structure in use, preventing water ingress and reducing the risk of rotting and other problems.

The mounting flange may define a mounting plane of the unit, and the face panel is preferably inclined with respect to the mounting plane such that a lowermost point of the periphery of the face panel is spaced further from the mounting plane than an uppermost point of the periphery of the face panel in use. Again, this arrangement helps to direct water that impinges on the glazing unit in use away from the structure.

To ease installation, the mounting flange may be formed to provide a plurality of fastener guides. Each guide may be arranged to locate a fastener for attaching the mounting flange to the structure. For example, each guide may comprise an indentation or recess in a face of the mounting flange so that, during installation, a screw or other fastener can be located with its tip in each indentation and then driven through the mounting flange and into the structure.

Preferably, the glazing unit is formed from a polymeric material. This reduces the weight of the glazing unit compared with a prior art glass pane of equivalent size, reducing the cost and environmental impact of transport in the supply chain. The glazing unit may be formed by a thermoforming process, which provides a convenient way of manufacturing a one-piece, integrally formed glazing unit. In one embodiment, the glazing unit is formed from a polyethylene terephthalate material, which provides suitable thermoplasticity, strength, toughness and optical clarity.

In a second aspect, the invention provides a glazing assembly comprising a glazing unit according to the first aspect of the invention, and a secondary unit for mounting on an inward side of the glazing unit. The secondary unit comprises a secondary face panel having a periphery enclosing the secondary face panel, and a secondary mounting flange for attachment to an inward side of the mounting flange of the glazing unit, the secondary mounting flange being connected to the periphery of the secondary face panel by a connecting wall. The connecting wall of the secondary unit is integrally formed with the secondary face panel and secondary mounting flange and extends away from the secondary mounting flange to space the secondary face panel from the secondary mounting flange in an outward direction, thereby to create an air gap between the face panel of the glazing unit and the secondary face panel of the secondary unit.

With this arrangement, the glazing assembly provides a simple double-glazed configuration to reduce heat and noise transfer across the glazing panel.

The glazing assembly may comprise a sealing element for forming a seal between the mounting flange of the glazing unit and the secondary mounting flange of the secondary unit. The secondary unit may also be a glazing unit according to the first aspect of the invention.

The invention also extends, in a third aspect, to a method for installing a glazing unit in an opening in a structure. The method comprises inserting a pre-formed glazing unit into the opening to position a mounting flange of the glazing unit against an inward side of the structure around a periphery of the opening, such that at least a part of a face panel of the glazing unit is positioned beyond an outward side of the structure around the periphery, and attaching the mounting flange to the inward side of the structure.

The method may comprise attaching the mounting flange to the inward side of the structure by driving a plurality of fasteners through the mounting flange to engage with the structure. The method may comprise locating each of the plurality of fasteners in a respective fastener guide formed in the mounting flange.

To form a double-glazed assembly, the method may comprise mounting a secondary unit on an inward side of the glazing unit, such that a secondary mounting flange of the secondary unit is positioned adjacent to an inward side of the mounting flange of the glazing unit, and so that an air gap is created between the face panel of the glazing unit and the secondary face panel of the secondary unit, and attaching the secondary mounting flange of the secondary unit to the mounting flange of the glazing unit. Mounting and attaching the secondary unit to the glazing unit is preferably performed before inserting the glazing unit into the opening.

In a fourth aspect, the invention provides a kit of parts for a building structure, comprising a wall panel having a window opening, and a glazing unit according to the first aspect of the invention or a glazing assembly according to the second aspect of the invention and including a glazing unit according to the first aspect of the invention. The glazing unit is shaped and dimensioned such that, when the mounting flange of the glazing unit is attached to an inward side of the wall panel around a periphery of the opening, the window opening is closed by the glazing unit and at least a bottom edge portion of the periphery of the face panel of the glazing unit protrudes beyond an outward side of the wall panel.

Preferred and/or optional features of each aspect of the invention may also be used, alone or in appropriate combination, in the other aspects also.

BRIEF DESCRIPTION OF THE DRAWINGS

Embodiments of the present invention will now be described, by way of example only, with reference to the accompanying drawings in which like reference signs are used for like features, and in which.

Figure 3:
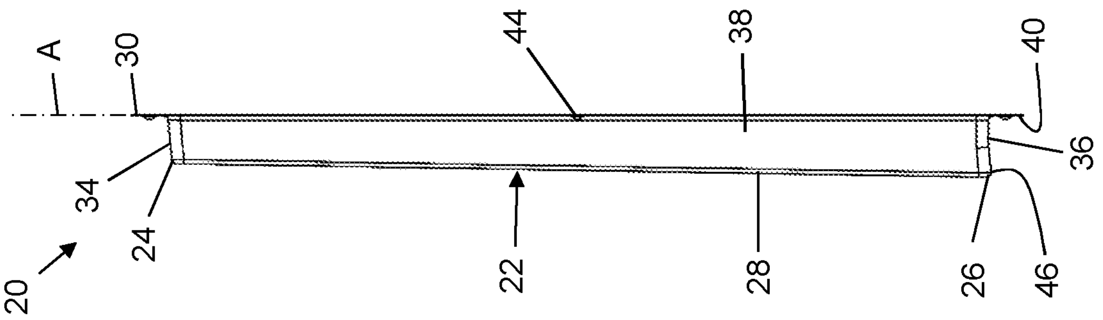
FIG. 3 is a side view of the glazing unit of FIG. 1.

Throughout this description, terms such as “front”, “forward” and so on refer to the side of the glazing unit that would be on the outside of the structure when installed (i.e. to the left in FIG. 3), and terms such as “back”, “rearward” and so on refer to the side of the glazing unit that would be on the inside of the structure (i.e. to the right in FIG. 3). Terms such as “top”, “upper”, “bottom” and “lower” refer to the orientation of the glazing unit in its intended installation orientation (i.e. the top being uppermost and the bottom being lowermost in FIG. 3).

DESCRIPTION OF THE PREFERRED EMBODIMENTS

Figure 1:
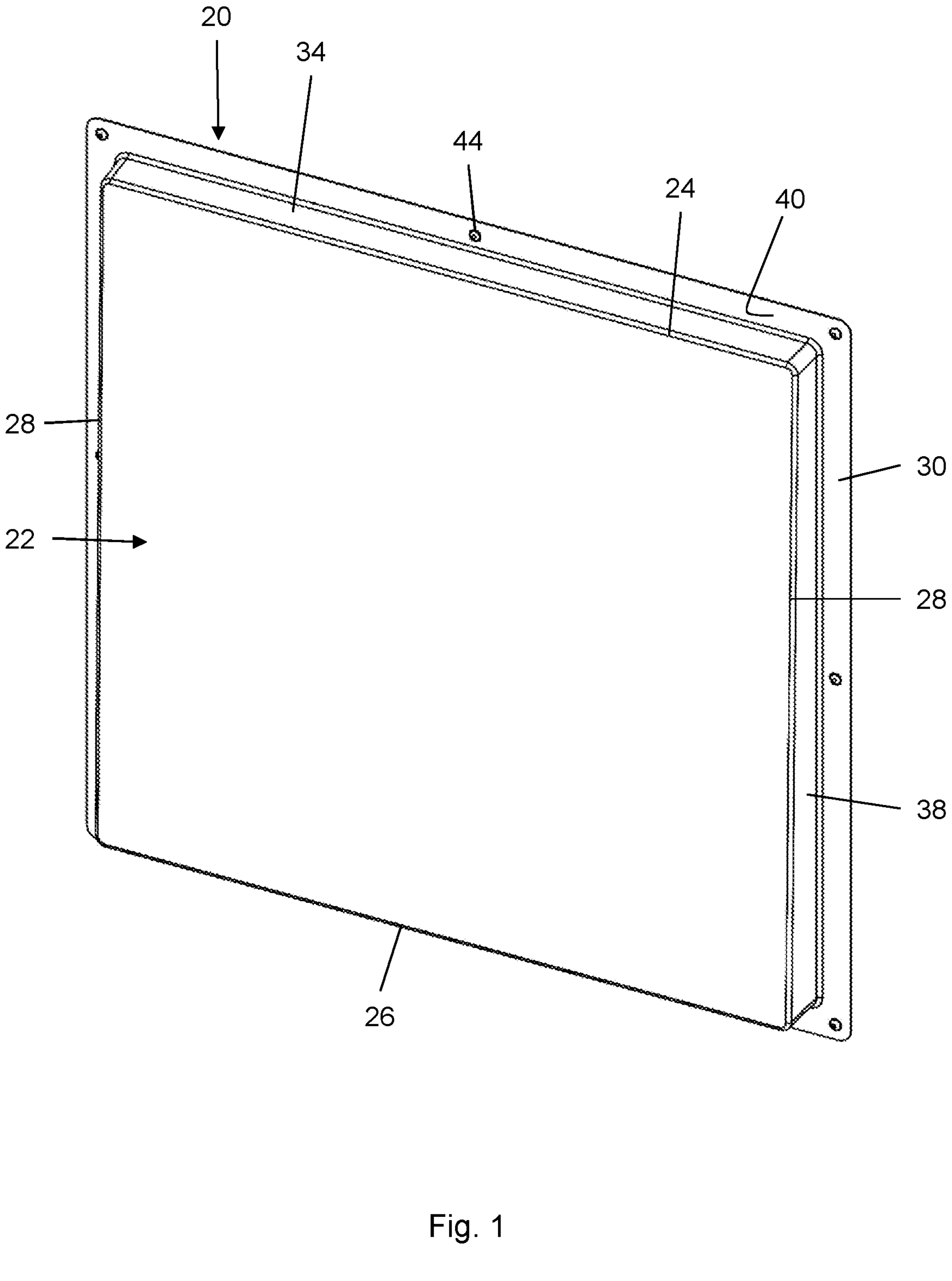
FIG. 1 is an isometric view of a glazing unit according to the invention.
Figure 2:
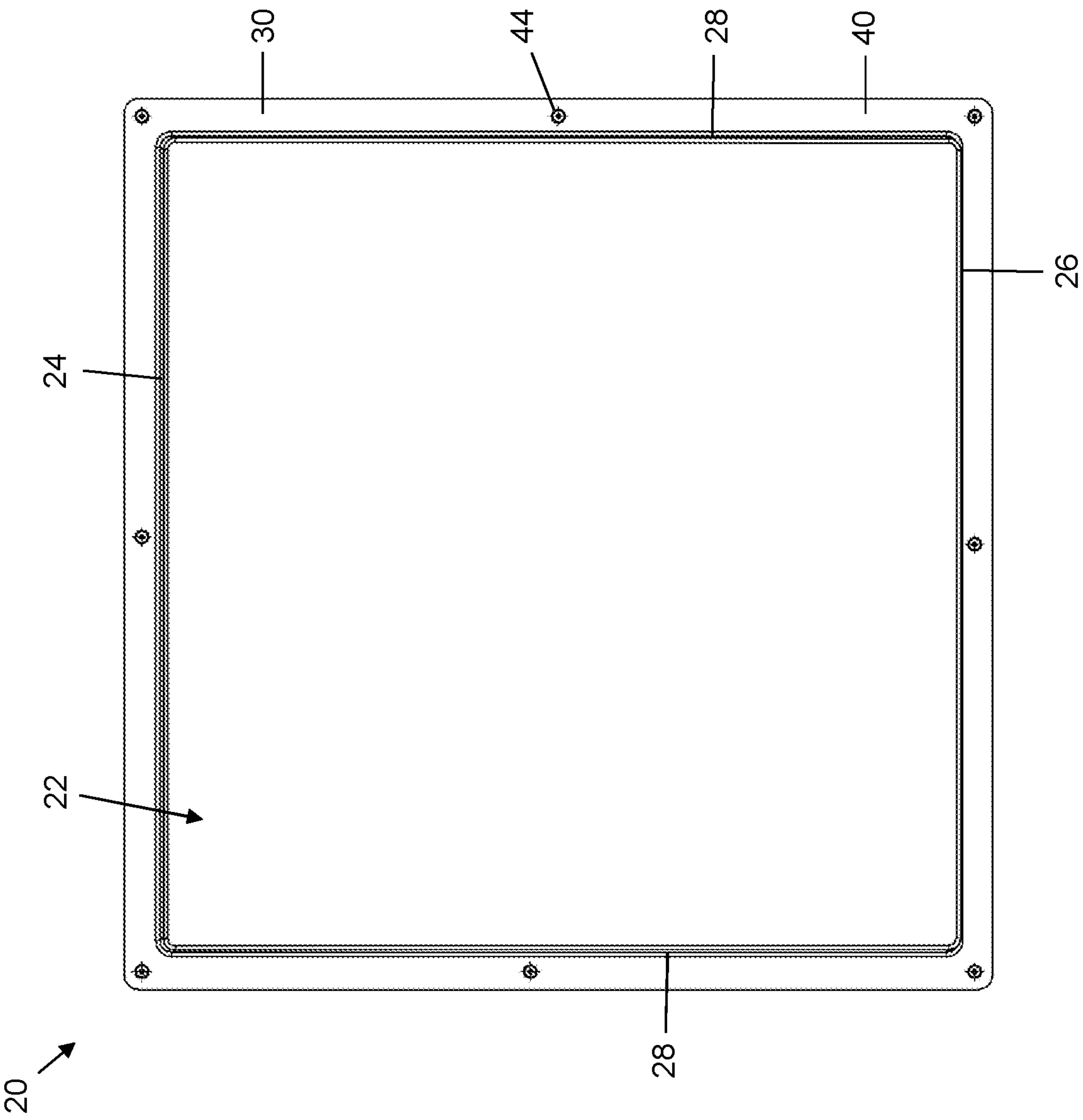
FIG. 2 is a front view of the glazing unit of FIG. 1.

FIGS. 1, 2 and 3 show a glazing unit 20 according to a first embodiment of the invention.

In this embodiment, the glazing unit comprises a rectangular face panel 22 having a top edge 24, a bottom edge 26, and first and second side edges 28 which together define portions of a periphery that encloses the face panel 22. The face panel 22 is surrounded by a mounting flange 30, which is set back rearwardly from the face panel 22. The mounting flange 30 is connected to the top, bottom and first and second side edges 24, 26, 28 of the face panel 22 by a connecting wall comprising top, bottom and first and second side panels 34, 36, 38, each of which extends frontwards from the mounting flange to connect with the face panel 22.

The face panel 22, the mounting flange 30 and the top, bottom and side panels 34, 36, 38 are integrally formed. In this way, the glazing unit 20 is of a one-piece construction, with no joins or seams between the connecting wall provided by the top, bottom and side panels 34, 36, 38 and either the face panel 22 or the mounting flange 30.

Figure 4:
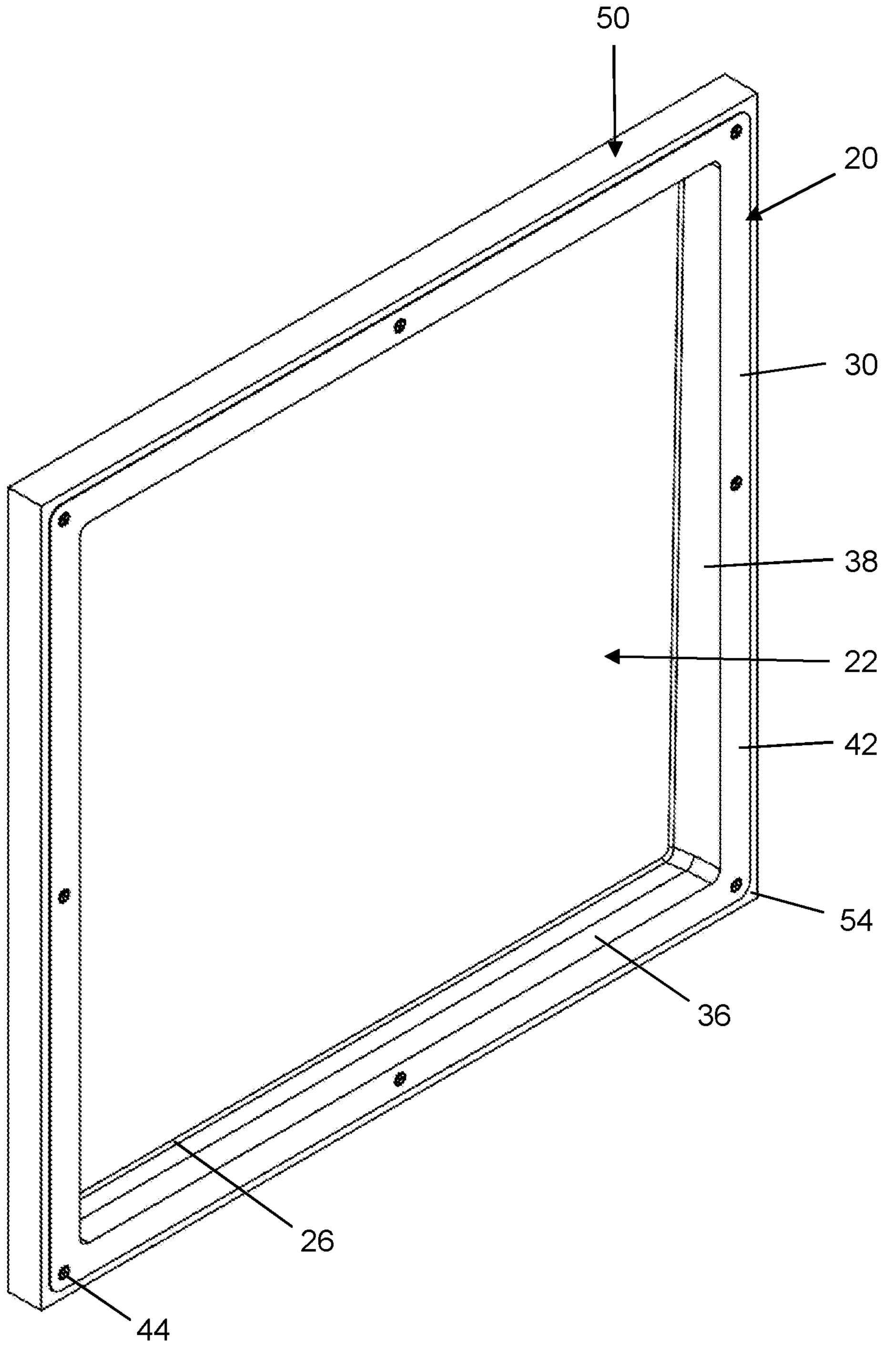
FIG. 4 is an isometric view of the glazing unit of FIG. 1, mounted in a window frame.
Figure 5:
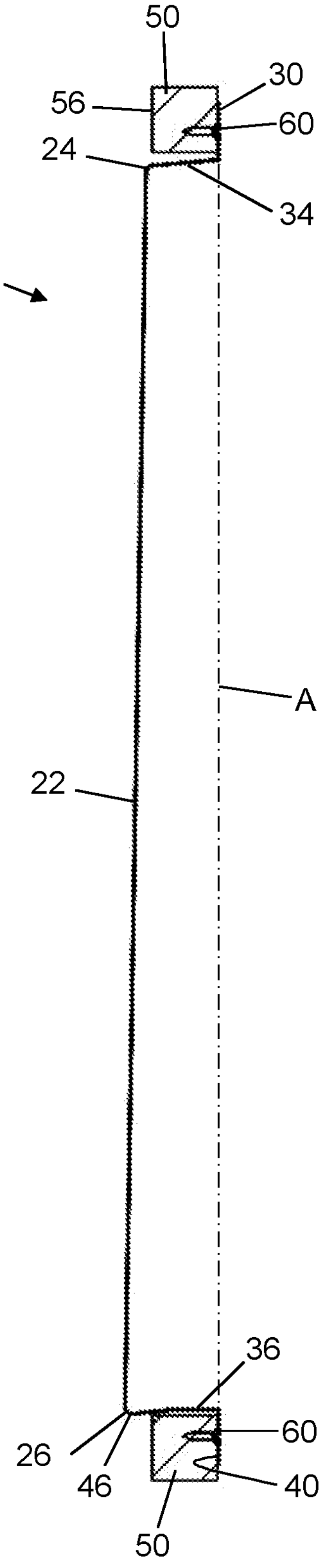
FIG. 5 is a cross-sectional side view of the glazing unit and frame of FIG. 4.
Figure 6:
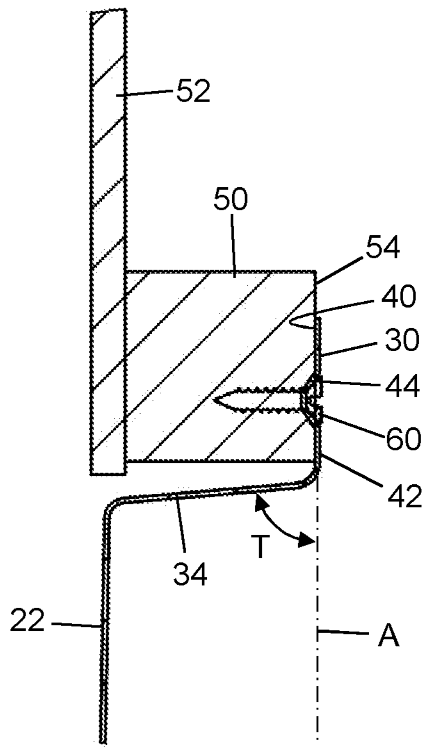
FIG. 6 is a cross-sectional side view of an upper part of the glazing unit and frame of FIG. 4 on an enlarged scale.
Figure 7:
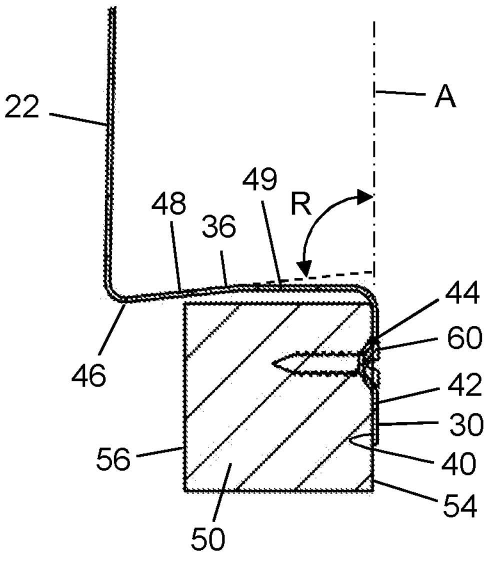
FIG. 7 is a cross-sectional side view of a lower part of the glazing unit and frame of FIG. 4 on an enlarged scale.

Referring additionally to FIGS. 4 to 7, the glazing unit 20 can be installed in a window frame 50 that extends around the peripheral edge of a window opening in a structure. Only the frame 50 of the structure is shown in FIGS. 4, 5 and 7, while FIG. 6 also shows part of a wall panel 52 in which the frame 50 is mounted. The frame 50 in this case is formed from square-section timber battens.

When installed, a front side 40 of the mounting flange 30 is disposed against an inner face 54 of the frame 50. The glazing unit 20 is secured with a plurality of fasteners (in this case self-tapping screws 60) that extend through the mounting flange from a back side 42 of the mounting flange 30 into the frame 50. In this way, the screws are accessible only from the inside of the structure, not the outside, making the glazing unit 20 difficult to remove from outside the structure and therefore improving security.

To ease installation, the mounting flange 30 is shaped to provide a plurality of dome-shaped guides 44. Each of the guides 44 therefore projects forward from the front side 40 of the mounting flange 30 and forms an indentation or recess in the back side 42 of the mounting flange 30. During installation, the front face 40 of the mounting flange 30 can be pressed against the inner face 54 of the frame 50, whereupon the projections formed by the guides 44 indent the frame 50 to a small extent and help to prevent the glazing unit 20 slipping out of position. Then, the screws 60 can be located in the recesses formed by the guides 44 to keep the screws 60 in place as they are driven home. As can be seen most clearly in FIGS. 6 and 7, the recesses accommodate the countersunk shape of the heads of the screws 60, so that the heads of the screws 60 are substantially flush with the back side 42 of the mounting flange 30 after installation. In this example, the guides 44 are uninterrupted by holes or apertures before installation and holes are formed in the guides 44 by the self-tapping screws 60 during fitting. It would however also be possible to provide holes in the central part of each guide 44 to accept the screws 60.

Referring particularly to FIGS. 3 and 5, the mounting flange 30 defines a mounting plane A of the glazing unit 20. When installed, the mounting plane A is substantially coplanar with the inner face 54 of the frame 50, so that, for a glazing unit 20 installed in a vertical wall panel, the mounting plane A will be substantially vertical.

The face panel 22 of the glazing unit 20 is inclined with respect to the mounting plane A, so that the bottom edge 26 of the face panel 22 is further from the mounting plane A than the top edge 24. In this way, water impinging on the face panel 22 is directed generally away from the wall of the structure as it drains downwards under gravity. In one example, the top edge 24 of the face panel 22 is approximately 30 mm from the mounting plane A and the bottom edge 26 of the face panel is approximately 40 mm from the mounting plane A.

Referring also to FIG. 6, the top panel 34 of the glazing unit 20 is inclined downwardly towards the face panel 22. Thus, moving outwardly from the mounting flange 30 towards the face panel 22, the top panel 34 drops away with respect to a normal to the mounting plane A, so that the top panel 34 forms an acute angle T with the mounting plane A. In this example, the angle T is approximately 85 degrees, although larger or smaller angles could be used. As a result, any water that impinges on the top panel 34 in use is generally directed away from the frame 50 to run towards the face panel 22.

As can be seen most clearly in FIG. 7, the bottom panel 36 is shaped to provide a drip-inducing formation 46 adjacent the bottom edge 26 of the face panel 22. In this example, the bottom panel 36 has a downwardly-inclined outer part 48 and an inner part 49 that is substantially perpendicular to the mounting flange 30 (and hence the mounting plane A). The downwardly-inclined outer part 48 in this example forms an obtuse angle R of approximately 96 degrees with the mounting plane A. The drip-inducing formation 46 is provided by the lowest part of the outer part 48 of the bottom panel 36, which acts as a drip edge. The drip-inducing formation is spaced away from the outer face 56 of the frame 50 and the outer surface of the building. In this way, water that reaches the bottom panel 36 (principally by running down the face panel 22) is encouraged by the drip-inducing formation 46 to drip off the bottom panel 36 instead of flowing back towards the frame 50 or the structure of the building.

In this embodiment, the combination of the outwardly-inclined face panel 22, downwardly-inclined top panel 34 and drip-inducing formation 46 on the bottom panel 36 is effective in diverting water away from the mounting flange 30. Accordingly, in many applications it is not necessary to provide any additional means for forming a seal between the mounting flange 30 and the frame 50. However, if desired, a seal could be provided for example by inserting an elastomeric gasket between the mounting flange and the inner face 54 of the frame 50, or by applying a sealant material such as a silicone or mastic sealant to the mounting flange 30 and/or the inner face 54 of the frame 50 before securing the glazing unit 20 with the screws 60.

The first and second side panels 38 are, in this example, inclined towards one another moving away from the mounting plane A. One advantage of such an arrangement is to improve the stackability of the glazing units 20 for storage and transport.

The depth of the glazing unit 20 (that is, the separation between the face panel 22 and the mounting flange 30), and in particular the depth of the bottom panel 36 from the bottom edge 26 of the face panel 22 to the mounting flange 30 is preferably selected so that the drip-inducing formation 46 is positioned outside the outer face 56 of the frame 50 and any adjacent wall panel. For aesthetic reasons, it is preferred that the depth of the top panel 34 is such that the top edge 24 of the face panel 22 is disposed close to the outer face 56 of the frame 50, so that the glazing unit 20 has the appearance from the outside of a substantially flush-mounted window pane.

Glazing units with different depths may be produced to suit frames of different depths. By way of example, for a frame with a depth of 28 mm between the inner face 54 and the outer face 56, the bottom edge 26 of the face panel 22 may be spaced approximately 38 mm from the mounting flange 30, so that the bottom edge 26 of the face panel 22 projects approximately 10 mm away from the frame 50. For a frame with a depth of 50 mm between the inner face 54 and the outer face 56, the bottom edge 26 of the face panel 22 may be spaced approximately 60 mm from the mounting flange. It will be appreciated that glazing panels suitable for substantially any frame depth and any projection distance between the bottom edge 26 of the face panel 22 and the frame 50 can be provided. One or more glazing units may be included in a kit of parts for building a shed or other temporary building along with timber frames and wall panels, with the size and depth of each glazing unit selected appropriately for the depth of the corresponding frames.

Figure 8:
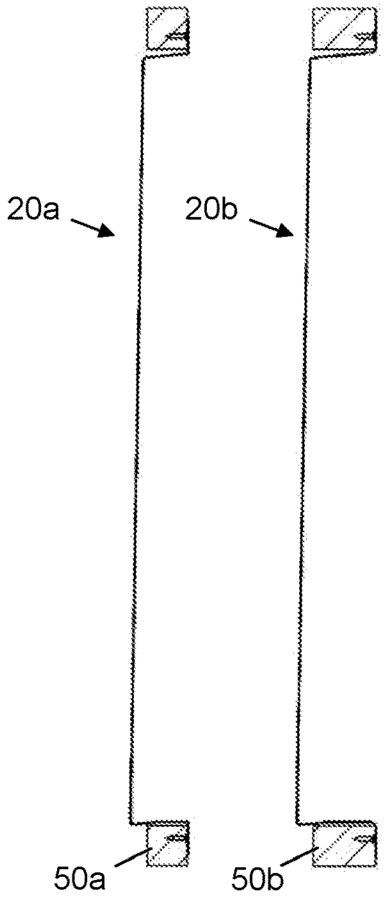
FIG. 8 shows cross-sectional side views of two further glazing units according to the invention.

FIG. 8 shows two illustrative examples, in which a first glazing unit 20*a* has a depth that suits a relatively shallow frame 50*a*, and a second glazing unit 20*b* has a depth that suits a relatively deep frame 50*b*.

The glazing panel 20 is preferably manufactured by thermoforming, and may be of a suitable plastics sheet material such as polyethylene terephthalate (PET). Recycled PET or UV-stabilised PET could be used if desired. The thickness of the sheet material before thermoforming is preferably between 0.5 and 1 mm, and more preferably around 0.7 mm, although thinner or thicker sheets could be used. Preferably, to allow easy removal of the glazing unit from a thermoforming mould, the inclined top panel 34 and the inclined outer part 48 of the bottom panel 36 are either parallel to one another or converge moving towards the face panel 22.

Glazing units according to the invention can be manufactured to fit substantially any window opening size. In some applications, however, it may be desirable to fit two or more glazing units adjacent to one another to provide a larger glazed area using smaller glazing units. For example, smaller glazing units may be stiffer and easier to manufacture, handle and install than a single large unit of equivalent size, or may be preferred for aesthetic reasons.

Figure 9:
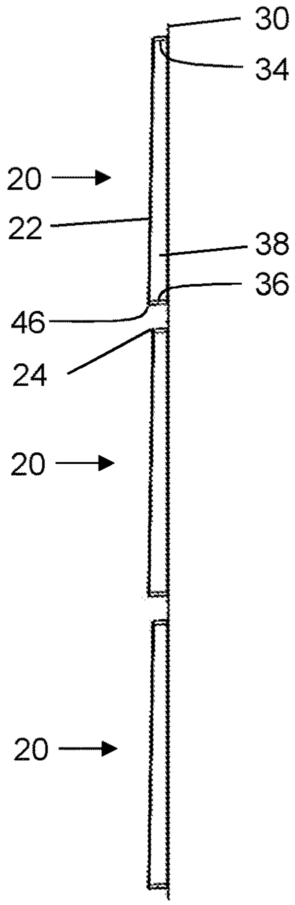
FIG. 9 is a side view of an assembly of glazing units according to the invention.

FIG. 9 is a side view of three glazing units 20 mounted in a vertically adjacent arrangement. The glazing units 20 are as described with reference to FIGS. 1 to 7, and are mounted to frames (not shown in FIG. 9) that extend between and around the top, bottom and side panels 34, 36, 38 of each glazing unit 20.

Advantageously, because the face panel 22 of each glazing unit 20 is inclined outwardly towards the bottom of each unit 20, the drip-inducing formations 46 are spaced outwardly with respect to the top edge 24 of the face panel 22 of the glazing unit 20 below. In this way, water is directed to flow downwards along successive face panels 22, rather than inwardly towards the frames.

Figure 10:
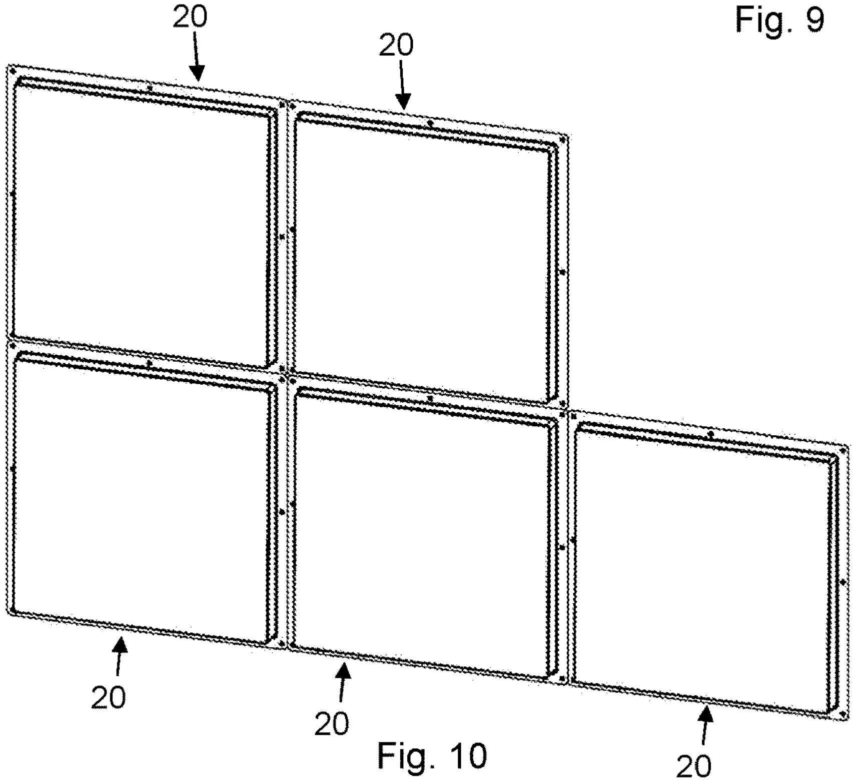
FIG. 10 is an isometric view of a further assembly of glazing units according to the invention.

As a further example, FIG. 10 shows five glazing units 20 mounted in a horizontally and vertically adjacent arrangement. Again, the frames that support the glazing units are not shown.

Figure 11:
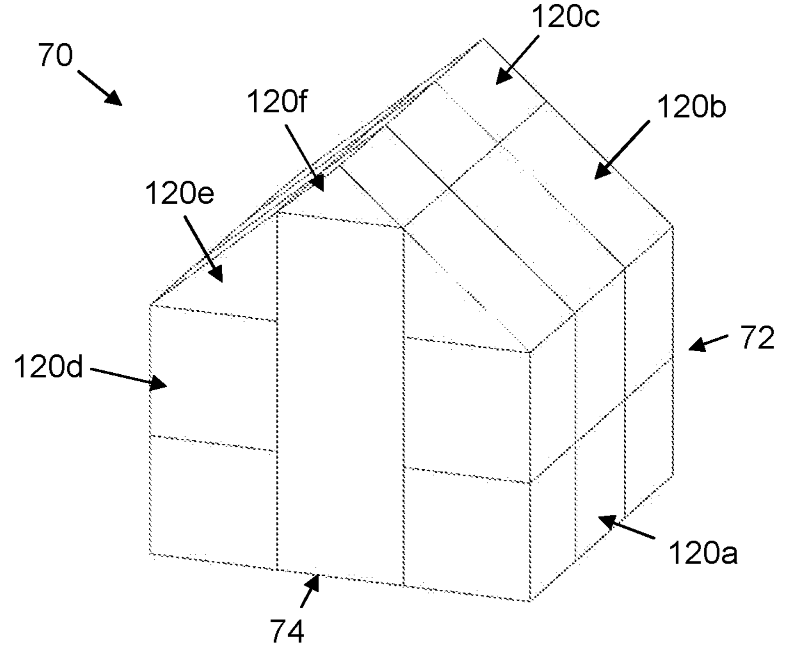
FIG. 11 is a schematic isometric view of a structure in which glazing units according to the invention can be used.

For some applications, non-rectangular glazing units may be provided. For example, FIG. 11 shows a greenhouse 70 that can be glazed using glazing units according to the invention. In this example, the side walls 72 of the greenhouse 70 are formed from six rectangular glazing units 120*a* arranged in a 3 (horizontal)×2 (vertical) configuration. The gable roof of the greenhouse 70 is formed from two further 3×2 arrays of rectangular glazing units, with the glazing units 120*b* in the lower row having a taller aspect ratio than the glazing units 120*c* in the upper row. The end of the greenhouse 70 shown in FIG. 11 is formed from two 1×2 arrays of square glazing units 120*d*, a pair of three-sided glazing units 120*e*, each the shape of a right-angle triangle and mounted above the 1×2 arrays, and a single glazing unit 120*f* in the shape of an isosceles triangle mounted above the doorway 74. Each of the glazing units 120*a*, 120*b*, 120*c*, 120*d*, 120*e*, 120*f* is mounted on a timber frame in the manner described above.

FIG. 12 shows further examples of glazing units with different shapes, to suit correspondingly-shaped frames. FIG. 12*a* shows a rectangular glazing unit 220*a*, while FIG. 12*b* shows a substantially square glazing unit 220*b*. In these cases, the periphery of the face panel includes top, bottom and first and second side edges, and the connecting wall includes top, bottom and first and second side panels as described above.

Figure 12A:
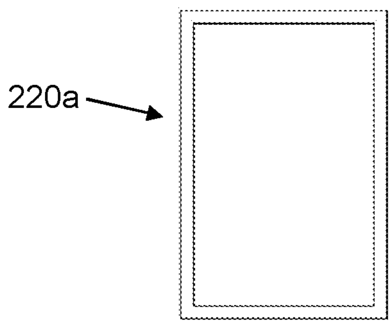
FIGS. 12*a* to 12*e* show front views of further glazing units according to the invention.
Figure 12B:
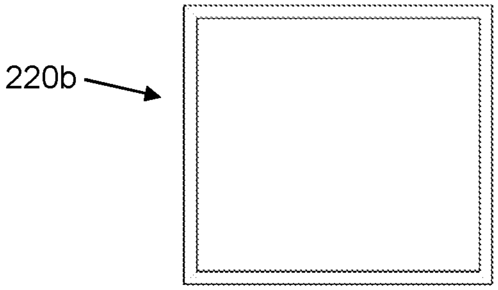
Figure 12C:
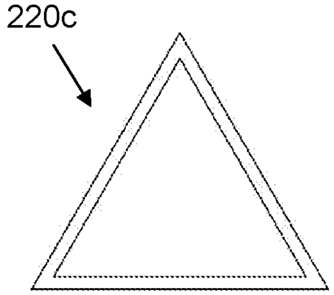

FIG. 12*c* shows a triangular glazing unit 220*c*. In this case, the periphery of the face panel includes first and second top edges, meeting at the apex of the triangle, and a bottom edge, and the connecting wall similarly includes first and second top panels and a bottom panel. Both the first and second top panels may be inclined downwardly to shed water, and the bottom panel may include the drip-inducing formation.

Figure 12D:
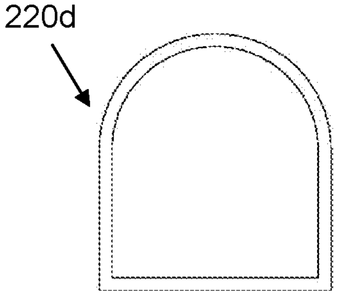

FIG. 12*d* shows a glazing unit 220*d* with an arch top. In this case, the periphery of the face panel includes a curved top edge, a bottom edge and first and second side edges, and the connecting wall includes a curved top panel, a bottom panel and first and second side panels. In this case, the curved top panel may be inclined downwardly to shed water, and the bottom panel may include the drip-inducing formation.

Figure 12E:
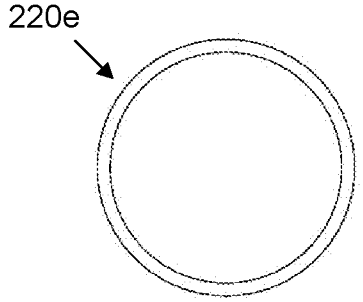

FIG. 12*e* shows a circular glazing unit 220*e*. In this case, the periphery of the face panel is circular and the connecting wall is annular. Here, a top edge portion of the periphery may be defined as the top half of the connecting wall and a bottom edge portion of the periphery may be defined as the bottom half of the connecting wall. The top edge portion may be inclined downwardly to shed water, and the bottom edge portion may include a drip-inducing formation.

In each of the cases shown in FIGS. 12*a* to 12*e*, the face panel may be inclined with respect to the mounting plane such that a lowermost point of the periphery of the face panel is spaced further from the mounting plane than an uppermost point of the periphery. For the rectangular-shaped units of FIGS. 12*a* and 12*b*, the bottom edge of the periphery defines the lowermost point and the top edge of the periphery defines the uppermost point. In the case of the triangular-shaped unit of FIG. 12*c* and the arch-top unit of FIG. 12*d*, the uppermost point is a single point at the apex or top of the face panel. For the circular unit of FIG. 12*e*, both the lowermost and uppermost points are single, vertically-aligned points at the top and bottom of the circular periphery. It will be appreciated that a wide variety of other shapes are also possible.

The glazing units illustrated in FIGS. 1 to 12 have planar, substantially transparent face panels, so as to have the appearance of a plain glazing pane. However, it is also possible to provide patterning on the face panel of a glazing unit to create desired glazing effects.

Figure 13:
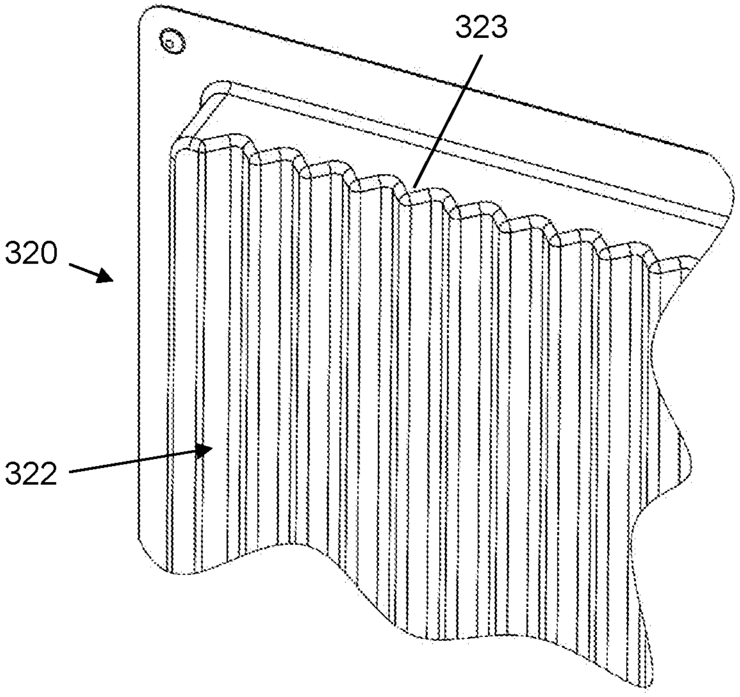
FIG. 13 is an isometric view of part of another glazing unit according to the invention.

For example, FIG. 13 shows a glazing panel 320 in which the face panel 322 is shaped into a plurality of vertically-oriented ribs 323. The ribs 323 serve to obscure the view through the face panel 322 for security or privacy, and also provide mechanical strengthening.

Figure 14A:
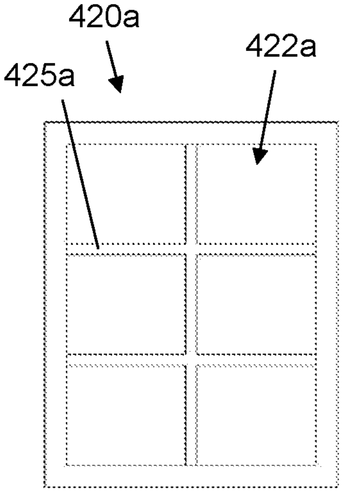
FIGS. 14*a*, 14*b* and 14*c* are front views of three further glazing units according to the invention.

FIG. 14*a* shows a glazing panel 420*a* in which the face panel 422*a* is shaped to provide vertical and horizontal recessed channels 425*a*, so that the face panel 422*a* has the appearance of a multi-pane window with window bars (also known as sash bars or muntins) between the panes. The channels 425*a* may be coloured or otherwise distinguished in appearance from the surrounding material to enhance the effect.

Figure 14B:
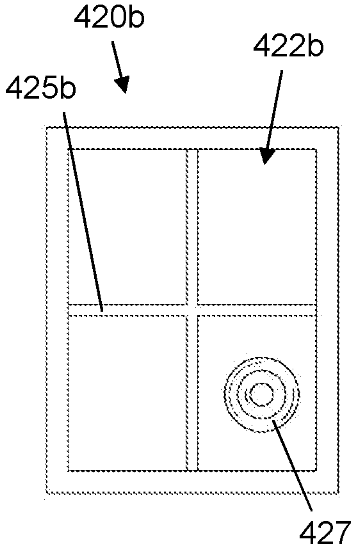

FIG. 14*b* shows a glazing panel 420*b* in which the face panel 422*b* also includes channels 425*b* to give the impression that the face panel 422*b* is divided into panes. In this case, one pane is shaped to include a "bull's eye" pattern 427, giving the appearance of a traditional crown glass pane.

Figure 14C:
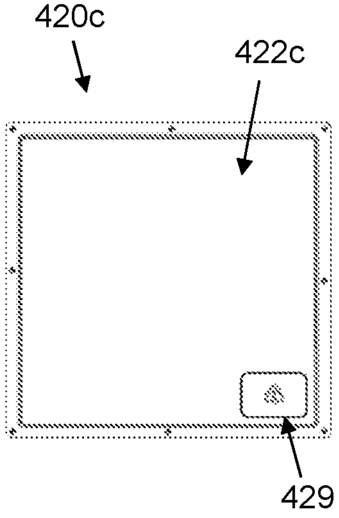

FIG. 14*c* shows a glazing panel 420*c* in which the face panel 422*c* includes an embossed information area 429, formed by a rectangular recess. In this example, the information area 429 is embossed to display a recycling symbol, but the information area 429 could instead or additionally display a brand name or logo, for example.

The patterned face panels shown in FIGS. 13 and 14 can be readily manufactured by use of suitable moulding tools during the thermoforming process. Other shapes and information, such as a manufacturer's name or logo, or a recycling symbol, can also be included on the face panel in the same way.

Surface finishes, such as frosting or etching, can also be applied by using suitable mould finishes. It is also possible to make the glazing panels from coloured or opaque materials, and to apply surface finishes, patterning, colouring and so on after manufacture (for example by applying a sprayed coating or an adhesive film).

Figure 15:
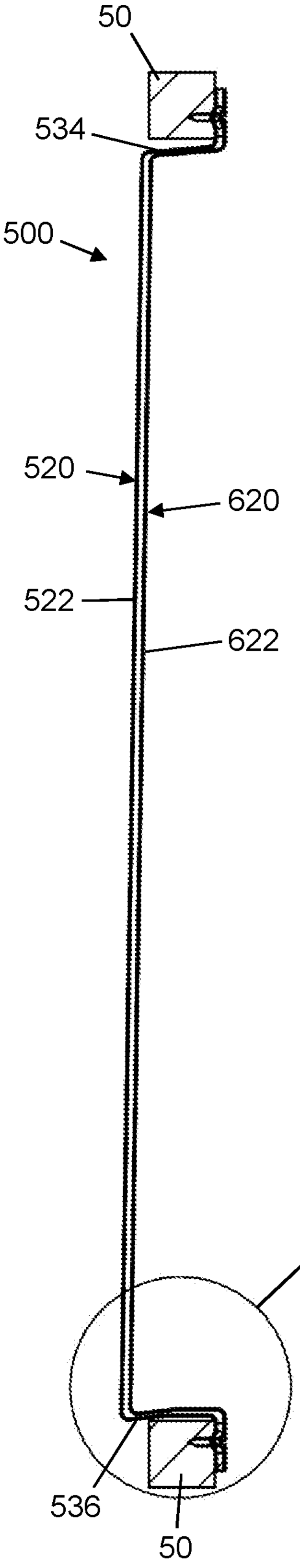
FIG. 15 is a cross-sectional side view of a glazing assembly according to the invention mounted in a frame.
Figure 16:
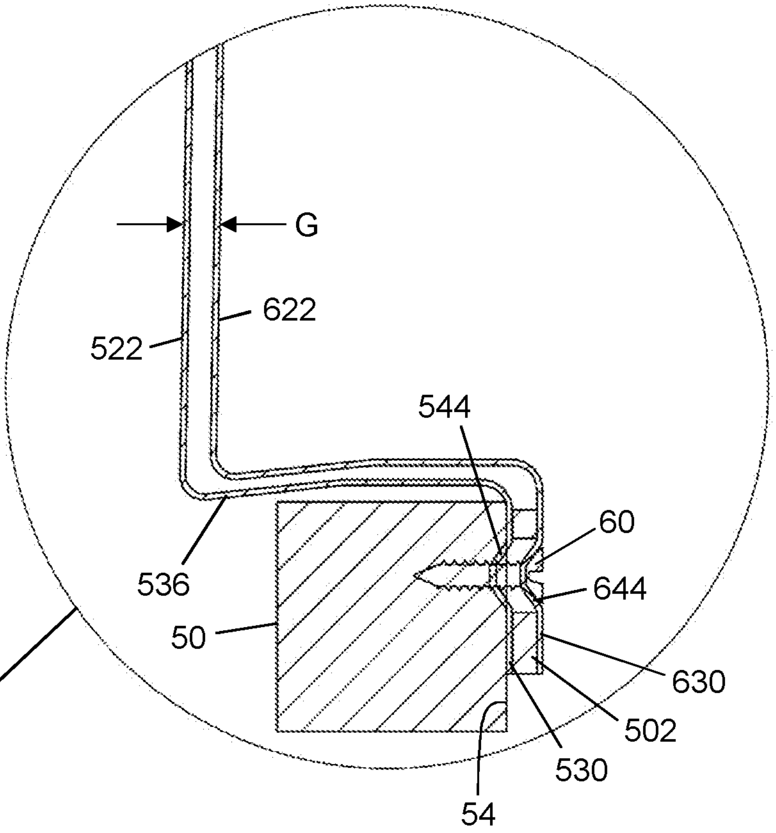
FIG. 16 is a cross-sectional side view of a lower part of the glazing assembly and frame of FIG. 15 on an enlarged scale.

FIGS. 15 and 16 show another embodiment of the invention, in the form of a glazing assembly 500. The glazing assembly 500 uses two glazing units 520, 620 together to form a double-glazed arrangement.

An outer glazing unit 520 of the assembly 500 is substantially as described with reference to FIGS. 1 to 7 above. Accordingly, the outer glazing unit 520 has a face panel 522 that forms the outer face of the assembly 500, a mounting flange 530, top and bottom panels 534, 536 and first and second side panels (not shown in FIGS. 15 and 16) that connect the face panel 522 to the mounting flange 530. The outer glazing unit 520 is sized to fit the opening in the frame 50 as described above.

The inner or secondary glazing unit 620 is also substantially as described with reference to FIGS. 1 to 7. The inner glazing unit 620 has the same overall dimensions as the outer glazing unit 520, but the width of the mounting flange 630 of the inner glazing unit 620 is larger than the width of the mounting flange 530 of the outer glazing unit 520 as can be seen most clearly in FIG. 16. The face panel 622 of the inner glazing unit 620 is correspondingly smaller, so that the face panel 622 of the inner glazing unit 620 fits inside the space bordered by the face panel 522 and the top, bottom and side panels 534, 536 (i.e. the connecting wall) of the outer glazing unit 520.

Again referring to FIG. 16, the edges and the fastener guides 544, 644 of the mounting flanges 530, 630 of the glazing units 520, 620 are aligned, and a sealing element in the form of a gasket 502 is positioned between the two mounting flanges 530, 630. In the resulting assembly, the face panel 522 of the outer glazing unit 520 is parallel to, and spaced apart from, the face panel 622 of the inner glazing unit 620, with the gap G between the face panels 522, 622 being determined by the thickness of the sealing gasket 502.

During installation of the assembly 500, the front side 540 of the mounting flange 530 of the outer glazing unit 520 is placed against the inner face 54 of the frame 50, and the screws 60 are driven through both of the mounting flanges 530, 630, using the fastener guides 544, 644 as described above.

The glazing assembly 500 therefore provides a double-glazed unit that reduces heat and noise transfer through the glazing assembly 500 compared to a single glazing unit as described with reference to FIGS. 1 to 7. It will be appreciated that the variations described above with reference to FIGS. 8 to 14 are equally applicable to either or both of the glazing units of the glazing assembly.

Conveniently, the sealing gasket 502 may be adherable to the mounting flanges 530, 630, so that the assembly 500 can be assembled before installation with the sealing gasket 502 holding the outer and inner glazing units 520, 620 together. Alternatively, the glazing units 520, 620 could be provided separately and the sealing gasket 502 inserted before or during installation. The sealing gasket 502 may be of an elastomeric material, such as a foam rubber strip, or may be a silicone, mastic or other curable sealing material.

In the illustrated assembly 500, the inner glazing unit 620 is generally of the same shape as the outer glazing unit 520. However, this need not be the case, and the inner glazing unit 620 could, for example, omit a drip inducing formation on the bottom panel and need not have an inclined face panel 622. The depth of the inner glazing unit 620 may be different to the depth of the outer glazing unit 520, in which case the size of the gap G will be determined by the thickness of the sealing gasket 502 and the difference in depth. It is also possible for both the outer and inner glazing units of the assembly to be identical. In this case, the inner glazing unit can be accommodated within the outer glazing unit by stacking.

Various modifications and variations on the above-described examples are possible. For instance, the face panel of the glazing unit could be substantially parallel with the mounting plane, instead of being inclined. In such cases, the thickness of the unit is preferably be such that the whole face panel is spaced from the outer face of the frame. Similarly, the top panel need not be inclined, but could instead be substantially perpendicular to the mounting plane.

The drip-inducing formation may be any suitable feature that encourages water to collect and drip from the unit at a particular location. The drip-inducing formation may be embodied as any suitable formation, such as a drip edge, a ridge or a groove, and may include or omit a corresponding inclined outer part of the bottom panel. In another variant, the whole of the bottom panel is inclined downwards moving towards the face panel. When the bottom panel is wholly or partly inclined downwardly towards the face panel, water is discouraged from flowing inwardly (and therefore upwardly) towards the mounting flange due to gravity, and instead collects at and drips from the lowest part of the bottom panel, which is positioned outwardly from the mounting flange.

The glazing units and glazing assemblies described above can be used in fixed window openings and also in opening windows and doors. While the examples described above are particularly suitable for use with timber structures (or at least structures with timber window frames), they could also be used with plastic or metal-framed buildings or those constructed from bricks, blocks, pre-fabricated concrete and so on. The glazing units and assemblies are not limited to use in temporary buildings, but could also find application in permanent structures.

Further modifications and variations are also possible without departing from the scope of the invention as defined in the appended claims.

The invention claimed is:

1. A pre-formed glazing unit for installation in an opening defined in a structure, the glazing unit comprising:

a face panel having a periphery enclosing the face panel; and a mounting flange for attachment to an inward side of the structure around a peripheral edge of the opening in use, the mounting flange being connected to the periphery of the face panel by a connecting wall;

wherein the connecting wall is integrally formed with the face panel and the mounting flange and extends away from the mounting flange to space the face panel from the mounting flange in an outward direction;

the periphery of the face panel includes a bottom edge portion and a top edge portion, and the connecting wall comprises a bottom panel connected to the bottom edge portion of the periphery and a top panel connected to the top edge portion of the periphery;

at least a portion of the top panel is inclined downwardly towards the face panel to deflect water in the outward direction in use;

the bottom panel is shaped to provide a drip-inducing formation;

the drip-inducing formation is a portion of the bottom panel inclined downwardly towards the face panel.

2. The pre-formed glazing unit according to claim 1, wherein the drip-inducing formation is disposed adjacent to the bottom edge of the face panel.

3. The pre-formed glazing unit according to claim 1, wherein the mounting flange is formed to provide a plurality of fastener guides, each guide being arranged to locate a fastener for attaching the mounting flange to the structure.

4. The pre-formed glazing unit according to claim 3, wherein each guide comprises an indentation in a face of the mounting flange.

5. The pre-formed glazing unit according to claim 1, formed from a polymeric material.

6. The pre-formed glazing unit according to claim 5, formed by a thermoforming process.

7. The pre-formed glazing unit according to claim 5, formed from a polyethylene terephthalate material.

8. A pre-formed glazing unit for installation in an opening defined in a structure, the glazing unit comprising:

a face panel having a periphery enclosing the face panel; and a mounting flange for attachment to an inward side of the structure around a peripheral edge of the opening in use, the mounting flange being connected to the periphery of the face panel by a connecting wall;

wherein the connecting wall is integrally formed with the face panel and the mounting flange and extends away from the mounting flange to space the face panel from the mounting flange in an outward direction;

the periphery of the face panel includes a bottom edge portion, and the connecting wall comprises a bottom panel connected to the bottom edge portion of the periphery; and the bottom panel is shaped to provide a drip-inducing formation, wherein the mounting flange defines a mounting plane of the unit, and wherein the face panel is inclined with respect to the mounting plane such that a lowermost point of the periphery of the face panel is spaced further from the mounting plane than an uppermost point of the periphery of the face panel in use.

9. A glazing assembly comprising the pre-formed glazing unit according to claim 1 and a secondary unit for mounting on an inward side of the glazing unit, the secondary unit comprising:

a secondary face panel having a periphery enclosing the secondary face panel; and a secondary mounting flange for attachment to an inward side of the mounting flange of the glazing unit, the secondary mounting flange being connected to the periphery of the secondary face panel by a connecting wall;

wherein the connecting wall of the secondary unit is integrally formed with the secondary face panel and secondary mounting flange and extends away from the secondary mounting flange to space the secondary face panel from the secondary mounting flange in an outward direction, thereby to create an air gap between the face panel of the glazing unit and the secondary face panel of the secondary unit.

10. The glazing assembly according to claim 9, comprising a sealing element for forming a seal between the mounting flange of the glazing unit and the secondary mounting flange of the secondary unit.

11. A method for installing a pre-formed glazing unit in an opening in a structure, the method comprising:

inserting a pre-formed glazing unit, the pre-formed glazing unit comprising:

a face panel having a periphery enclosing the face panel; and a mounting flange for attachment to an inward side of the structure around a peripheral edge of the opening in use, the mounting flange being connected to the periphery of the face panel by a connecting wall;

wherein the connecting wall is integrally formed with the face panel and the mounting flange and extends away from the mounting flange to space the face panel from the mounting flange in an outward direction;

the periphery of the face panel includes a bottom edge portion and a top edge portion, and the connecting wall comprises a bottom panel connected to the bottom edge portion of the periphery and a top panel connected to the top edge portion of the periphery;

at least a portion of the top panel is inclined downwardly towards the face panel to deflect water in the outward direction in use;

the bottom panel is shaped to provide a drip-inducing formation;

the drip-inducing formation is provided by a feature selected from the group consisting of at least a portion of the bottom panel inclined downwardly towards the face panel, a drip edge, a ridge, and a groove, into the opening to position a mounting flange of the glazing unit against an inward side of the structure around a periphery of the opening, such that at least a part of a face panel of the glazing unit is positioned beyond an outward side of the structure around the periphery; and attaching the mounting flange to the inward side of the structure.

12. The method according to claim 11, comprising attaching the mounting flange to the inward side of the structure by driving a plurality of fasteners through the mounting flange to engage with the structure.

13. The method according to claim 12, comprising locating each of the plurality of fasteners in a respective fastener guide formed in the mounting flange.

14. The method according to claim 11, comprising:
mounting a secondary unit on an inward side of the glazing unit, such that a secondary mounting flange of the secondary unit is positioned adjacent to an inward side of the mounting flange of the glazing unit, and so that an air gap is created between the face panel of the glazing unit and the secondary face panel of the secondary unit; and
attaching the secondary mounting flange of the secondary unit to the mounting flange of the glazing unit.

15. The method according to claim 14, comprising mounting and attaching the secondary unit to the glazing unit before inserting the glazing unit into the opening.

16. A kit of parts for a building structure, comprising:
a wall panel having a window opening; and
the pre-formed glazing unit according to claim 1, shaped and dimensioned such that, when the mounting flange of the glazing unit is attached to an inward side of the wall panel around a periphery of the opening, the window opening is closed by the glazing unit and at least a bottom edge portion of the periphery of the face panel of the glazing unit protrudes beyond an outward side of the wall panel.

17. A kit of parts for a building structure, comprising:
a wall panel having a window opening; and
the glazing assembly according to claim 9, shaped and dimensioned such that, when the mounting flange of the glazing unit is attached to an inward side of the wall panel around a periphery of the opening, the window opening is closed by the glazing unit and at least a bottom edge portion of the periphery of the face panel of the glazing unit protrudes beyond an outward side of the wall panel.

* * * * *